May 9, 1967 B. FRANCHI ETAL 3,319,010
SWITCHING ARRANGEMENT FOR THE TRANSMISSION AND RE-TRANSMISSION OF SIGNALS OVER TELEPHONE LINES
Filed April 22, 1964
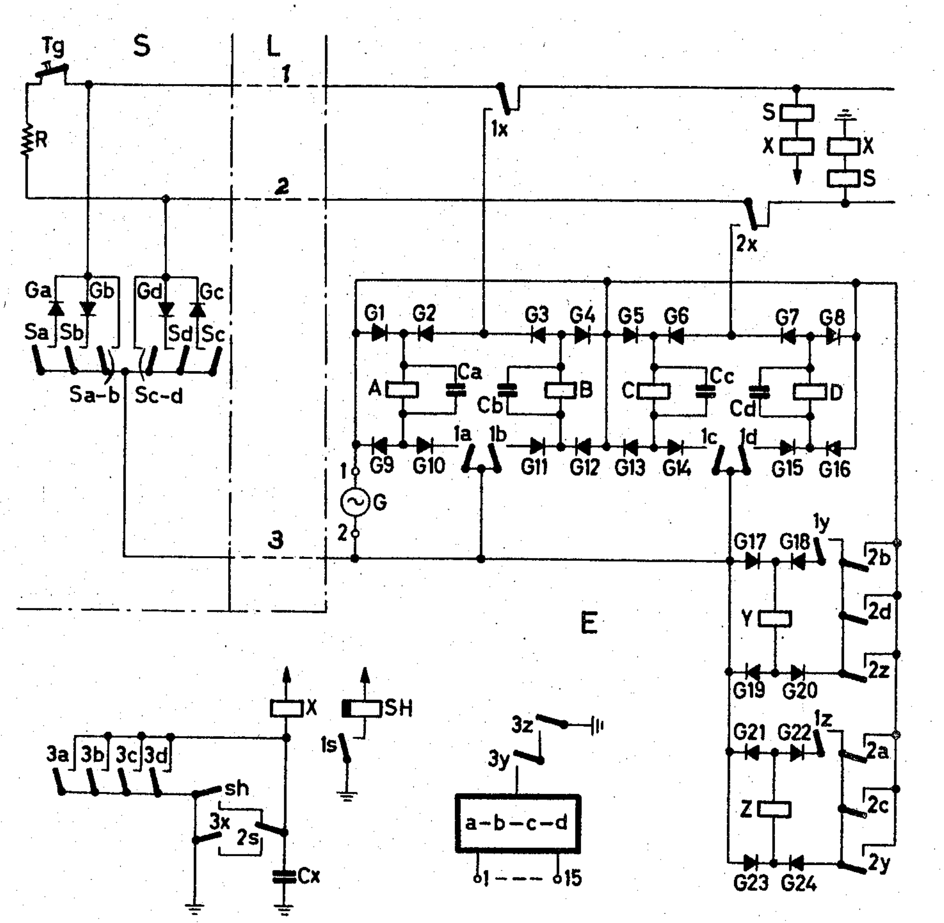

3,319,010

SWITCHING ARRANGEMENT FOR THE TRANSMISSION AND RE-TRANSMISSION OF SIGNALS OVER TELEPHONE LINES

Bruno Franchi and Wilhelm Fath, Munich, Germany, assignors to Siemens & Halske Aktiengesellschaft Berlin and Munich, a corporation of Germany Filed Apr. 22, 1964, Ser. No. 361,911
Claims priority, application Germany, Apr. 23, 1963, S 84,825
3 Claims. (Cl. 179—84)

For the transmission of signals over communication lines it is a known practice to selectively switch the half-waves of differing polarity from an alternating current source disposed at the receiving station through selectively switched rectifiers at the transmission station in different combinations. The utilization of the half waves selectively switched at the transmission station takes place through receiving switching members allocated to the conductors of the communication line in pairs, with differing directional sensitivity, which, corresponding to the rectifiers are switched to ground at the transmission station over the alternating current source, in which system the ground can be replaced by a common return circuit if need be, by another conductor of the communication line. Altogether, in this manner with use of two-wire communication lines and utilization of ground as the return circuit, fifteen clearly recognizable signals can be transmitted, consisting in each case of four code symbols. The transmission of these four code symbols per signal takes place in two time divisions, namely in each case one symbol per conductor during the positive half-wave and one symbol per conductor during the negative half-wave of the applied signal alternating current. Since the individual receiving switching members, in consequence of their directional sensitivity, are held in each case only until the end of the alternating current half-wave responsible for the operation of the receiving switching member, there is allocated to each receiving switching member an individual auxiliary switching member, for example an additional relay, which is switched in a holding current circuit dependent on the duration of signal transmission and serves for the marking of the particular code symbol received. Further, in the receiving station there is provided a delay switching member, for example in the form of a breaking delay relay, whose operating circuit is interrupted upon the connection of the evaluation device to the transmission line and which, only upon its drop-out, switches control voltage to the signal line selected through the contacts of the excited receiving relay. The releasing time of this relay is so dimensioned that a transmitted signal can, with certainty, be recognized. As a consequence of the safety factors incorporated in the dimensioning of the delay switching member, there arise unnecessary time losses, which especially in installations with one evaluation device in common for several lines, can have a disadvantageous effect.

The invention likewise relates to a switching arrangement for the transmission of signals over multi-wire communication lines through the connection of an alternating current source between the individual conductors of the communication line and a common return circuit, for example ground, whose half-waves are effectively switched in various combinations at the transmission station by rectifiers and are evaluated at the receiving station by receiving switching members with directional sensitivity, allocated to the individual conductors in pairs, for example relays which are circuited with rectifiers. The invention avoids the disadvantages of the known system by the allocation to the receiving switching members of the same directional sensitivity, with reference to the positive and negative half-waves of the signal alternating current, of a common control switching member of opposite directional sensitivity which, after operation of one of the allocated receiving switching members, operates over contacts of the latter, such operation in each case being offset by the duration of one alternating current half-wave, with the retransmission of the signal received taking place in each case only after all the control switching members are actuated. The retransmission of a signal received at the receiving switching members, therefore takes place in direct dependence on the receiving switching members, independently of the direction and the phase position of the first effective half-wave of the signal alternating current, at the latest, after approximately three half-waves, and thus immediately following signal recognition.

Additional holding windings for bridging pauses between half-waves of the same direction can be dispensed with if each control switching member is connected in the diagonal branch of an individual rectifier bridge whose one bridge branch is disposed in each case in the operating circuit extending over the common alternating current source and the contacts of the corresponding receiving switching members, while the other bridge branch is completed, only after operation of the control switching member, directly over the common alternating current source, whereby the half-waves directed oppositely to the operating direction can be utilized for the holding of the energized control switching members.

The same principle may also be utilized for the receiving switching members.

Further details of the invention will be explained in connection with the drawing, which illustrates an embodiment of the invention in the form of a two-wire subscriber loop of a telephone installation. The left-hand part of the drawing illustrates the transmitting station S, a subscriber station having transmitting contacts S*a*, S*b*, S*a–b*, S*c*, S*d* and S*c–d*. The right-hand part of the drawing illustrates the feed bridge of the connecting line in the exchange and below it the evaluating device with the receiving relays A, B, C and D and the control relays Y and Z. Each of these relays is connected in a rectifier bridge, one branch of which, for example the rectifiers G2 and G9 in connection with the receiving relay A, is disposed, in each case, in the operating circuit, while the other branch, according to the example presented, the rectifiers G1 and G10, is selectively switched only after operation of receiving relay A over contact 1*a*.

The operation of this system is as follows: In the normal operating condition, that is when the hand set is picked up, only the feed bridge relay S lying in the subscriber loop is energized. If the subscriber presses a figure or digit key disposed at his station, the transmitting contacts (S) associated with this key are closed and prepare the signal circuits extending over the two conductors 1 and 2 of the communication line L and the common return conductor 3. Simultaneously the common key contact T*g*, coupled with the keys, is opened and the loop circuit extending to the subscriber station is thereby interrupted. Furthermore, the key operation, in a manner in itself known, has as its consequence the operation of the differential relay X switched in series with the feed bridge relay S, since either through the ground connection resulting on operation of a selector key to the conductor 1, the current flowing over this conductor and the connected feed bridge half is increased or else, with dropping out of the feed bridge relay in consequence of an interruption of the loop current circuit through the common key contact T*g* the discharge current circuit for the condenser C*x* is closed over contacts 2*s* and *sh*. Contacts 1*x* and 2*x* disconnect the feed bridge from the line L and switch over to receiving position. The feed bridge relay S, accordingly, in case it had not already dropped out in consequence of the loop interruption through the common key contact T*g*, can finally drop out. The relay X, however, continues to be held over contact 2*s* and contact *sh*.

With switch-over of conductors 1 and 2 to the receiving device through the contacts 1*x* and 2*x*, the signal circuits previously prepared through the transmitting contacts S are finally closed. Depending on the direction of the first effective half-wave of alternating current from generator G there result the following operating circuits for the receiving relays A to D:

(1) $$G(2), 3, \frac{Sa, Ga, 1, 1x, G2, A, G9}{Sc, Gc, 2, 2x, G6, C, G13} G(1)$$

(2) $$G(1), \frac{G12, B, G31x, 1, Gb, Sb}{G16, D, G7, 2x, 2, Gd, Sd} 3, G(2)$$

Which of these four possible operating circuits is switched through is dependent upon the transmitting contacts operated. The condensers C*a* to C*d* connected in parallel with the respective receiving relays A to D serve for the suppression of interference impulses possibly occurring in the closing and opening of the operating circuits and for smoothing the pulsating direct current flowing over the relay winding following operation, in order to avoid a buzzing of the contact armature in the event rapidly operating switching receiving members, for example, contact armature relays, are employed.

As soon as one of the receiving relays is energized, it completes, over one of its contacts, the holding current circuit of the corresponding rectifier bridge, so that the following holding circuits result for the duration of the half-waves directed oppositely to the operating direction:

(3) $$G(1), \frac{G1, A, G10, 1a}{G5, C, G14, 1c} G(2)$$

(4) $$G(2), \frac{1b, G11, B, G4}{1d, G15, D, G8} G(1)$$

Further the contacts 2*a* and/or 2*c* or 2*b* and/or 2*d* close the operating circuit of the corresponding control relays Z and Y, respectively:

(5) $$G(1), \frac{2a}{2c}, G24, Z, G21, G(2)$$

(6) $$G(2), G17, Y, G20, \frac{2b}{2d}, G(1)$$

Contacts 1*z* or 1*y* switch the second bridge branch of the particular rectifier bridge so that there will result the following holding circuits for the duration of the half-waves directed oppositely to the operating direction:

(7) $$G(2), G23, Z, G22, 1z, \frac{2a}{2c}, G(1)$$

(8) $$G(1), \frac{2b}{2d}, 1y, G18, Y, G19, G(2)$$

For the explanation of the time relations resulting upon the transmission of a signal, it will be assumed that with the closing of the signal circuits corresponding to circuits (1) and (2), the terminal 2 of the alternating current source G is positive with respect to terminal 1 and that the current flowing during this first half-wave suffices to energize the connected receiving relays. Accordingly, dependent upon the operated transmitting contacts S*a*, S*c*, S*a–b* or S*c–d* in circuit (1) the relay A and/or C can respond. In the subsequent halfwave of opposite direction these relays are held in the holding current circuit (3). Further, in circuit (2), likewise dependent on the operated transmitting contacts S*b*, S*d*, S*a–b* or S*c–d*, the receiving relays B and/or D and in circuit (5) the control relay Z can respond. In the subsequent third half-wave these relays are likewise held in the apertaining holding current circuits (4) and (7). Further, in circuit (6) the last control relay Y can respond as a signal that the transmitted signal, in the absence of a transmission fault, is correct. The signal line selected over contacts of the receiving relays A to D, is then switched to control voltage over contacts 3*z* and 3*y*.

The contacts 2*y* and 2*z*, respectively, connected in parallel with contacts 2*a* and 2*c* in circuits (5) and (7), and 2B and 2D, respectively in circuits (6) and (8) insure that both control relays Y and Z are energized and effect the retransmission of the transmitted signal, even if the code symbols making possible the operation are not present in a transmitted signal, as for example, if only the transmitting contacts S*a* and S*c* are actuated.

The energized receiving and control relays now remain held alternately in one of the circuits (1), (2), (5) and (6), or (3), (4), (7), and (8) until the response circuits (1) or (2) are again interrupted on return of the actuated key into the rest position. Likewise the differential relay X remains excited over contacts 2*a*, 2*b*, 2*c* or 2*d* of the particular receiving relay energized. It is only when all the receiving relays have dropped out that the differential relay X also returns to its rest position and, with its contacts 1*x* and 2*x* switches over the conductors 1 and 2 from the receiving device to the feed bridge.

The basic principle of the invention is not limited to the embodiment illustrated. This is particularly true with respect to the connection of the receeiving device to the conductors of the communication line and its disconnection after retransmission of the received signal. Also, instead of relays, electronic components are equally utilizable as receiving and control switching members.

Changes may be made within the scope and spirit of the appended claims which define what is believed to be new and desired to have protected by Letters Patent.

We claim:

1. A switching arrangement for the transmission of signals over multi-wire communication lines between a transmitting station and a receiving station comprising means for generating an alternating current, operatively connectable between the individual line conductors and a common return conductor such as ground, means at the transmitting station for selectively switching half waves from said generator through rectifiers in different combinations, and means at the receiving station for evaluating such half waves, said evaluation means comprising receiving switching members which are directionally sensitive and allocated to the individual conductors in pairs, a control switching member allocated to the receiving switching members of one directional sensitivity, and a control switching member allocated to the receiving switching members of the other directional sensitivity, the respective control switching members having a direction sensitivity which is opposite to that of the receiving switching members to which they are allocated, whereby operation of the respective control switching members, responsive to operation of one of the receiving switching members allocated thereto, takes place offset by the duration of one alternating current half-wave, and means responsive to operation of both control switching members for enabling retransmission of the received signal, whereby such retransmission takes place only after operation of both control switching members.

2. A switching arrangement according to claim 1, wherein each of the receiving switching members and each of the control switching members are connected in the diagonal branch of a respective individual rectifier bridge whose one bridge branch is disposed in the operating circuit extending over the common alternating current source, while the other bridge branch is complete, only after operation of the particular receiving or control switching member, directly with the common alternating current source.

3. A switching arrangement according to claim 2, wherein the receiving and control switching members are constructed as contact armature relays, and a smoothing condenser is connected in parallel with each receiving relay.

No references cited.

KATHLEEN H. CLAFFY, *Primary Examiner.*

H. ZELLER, *Assistant Examiner.*